US009596328B2

(12) United States Patent
Subramanya et al.

(10) Patent No.: US 9,596,328 B2
(45) Date of Patent: Mar. 14, 2017

(54) HIERARCHICAL CRITERIA-BASED TIMEOUT PROTOCOLS

(75) Inventors: Ramya Subramanya, Basaveshwaranagar (IN); Vipin Koottayi, Trikarpur (IN); Aarathi Balakrishnan, Bannerghatta Road (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 386 days.

(21) Appl. No.: 13/571,045

(22) Filed: Aug. 9, 2012

(65) Prior Publication Data

US 2014/0047113 A1 Feb. 13, 2014

(51) Int. Cl.
*H04L 29/06* (2006.01)

(52) U.S. Cl.
CPC .................................. *H04L 69/28* (2013.01)

(58) Field of Classification Search
None
See application file for complete search history.

(56) References Cited

U.S. PATENT DOCUMENTS

| | | | |
|---|---|---|---|
| 5,864,843 A * | 1/1999 | Carino et al. | |
| 6,460,141 B1 * | 10/2002 | Olden | .............................. 726/4 |
| 7,647,443 B1 * | 1/2010 | Chatterjee | ............. G06F 3/0622 |
| | | | 710/200 |
| 8,046,731 B2 | 10/2011 | Sabev et al. | |
| 8,082,581 B2 | 12/2011 | Wu | |
| 8,141,139 B2 * | 3/2012 | Hinton et al. | ..................... 726/8 |
| 8,204,931 B2 * | 6/2012 | Stanev et al. | ................. 709/203 |
| 8,214,394 B2 * | 7/2012 | Krishnaprasad et al. | .... 707/781 |
| 8,561,161 B2 * | 10/2013 | Blakley et al. | ..................... 726/8 |
| 2002/0069200 A1 * | 6/2002 | Cooper | ............... H04L 12/2602 |
| 2002/0078231 A1 * | 6/2002 | Chang et al. | ................. 709/238 |
| 2002/0095414 A1 * | 7/2002 | Barnett et al. | .................... 707/9 |

(Continued)

FOREIGN PATENT DOCUMENTS

JP 2006146298 A 6/2006

OTHER PUBLICATIONS

Gutzmann, Kurt. "Access control and session management in the HTTP environment." Internet Computing, IEEE 5.1 (2001): 26-35.*

(Continued)

*Primary Examiner* — Scott B Christensen
*Assistant Examiner* — Lam Do
(74) *Attorney, Agent, or Firm* — Kilpatrick Townsend & Stockton LLP

(57) ABSTRACT

A method of applying a timeout protocol by an access manager to a plurality of resources may include storing the timeout protocol comprising at least one criterion, and receiving a request for a first resource. Each of the resources can be segregated into separate application domains, the first resource can be associated with a first attribute, and the first attribute can be assigned a first value. The method may also include determining that the first value satisfies the at least one criterion, associating the timeout protocol with the first resource, and associating the timeout protocol with each resource that is associated with the first attribute assigned a value that satisfies the at least one criterion. The method may further include granting access to the first resource according to the timeout protocol.

20 Claims, 10 Drawing Sheets

(56) References Cited

U.S. PATENT DOCUMENTS

| | | | |
|---|---|---|---|
| 2002/0188568 A1* | 12/2002 | Nickolaisen | G06F 21/31 705/52 |
| 2003/0115322 A1* | 6/2003 | Moriconi et al. | 709/224 |
| 2003/0154398 A1* | 8/2003 | Eaton | G06Q 30/08 709/227 |
| 2003/0195866 A1* | 10/2003 | Long et al. | 707/1 |
| 2004/0006710 A1* | 1/2004 | Pollutro et al. | 713/201 |
| 2004/0006711 A1* | 1/2004 | Krishnaswamy et al. | 713/201 |
| 2004/0098615 A1* | 5/2004 | Mowers et al. | 713/201 |
| 2004/0128393 A1* | 7/2004 | Blakley et al. | 709/229 |
| 2004/0128542 A1* | 7/2004 | Blakley, III | H04L 63/0281 726/12 |
| 2004/0181476 A1* | 9/2004 | Smith et al. | 705/35 |
| 2005/0008163 A1* | 1/2005 | Leser et al. | 380/281 |
| 2005/0021978 A1* | 1/2005 | Bhat | H04L 63/102 713/182 |
| 2006/0048213 A1* | 3/2006 | Cheng et al. | 726/5 |
| 2006/0074618 A1* | 4/2006 | Miller et al. | 703/13 |
| 2006/0123472 A1* | 6/2006 | Schmidt et al. | 726/8 |
| 2006/0161885 A1* | 7/2006 | Krishnaswamy | G06F 9/468 717/104 |
| 2006/0179009 A1* | 8/2006 | Tagg | 705/80 |
| 2006/0248198 A1* | 11/2006 | Galchev | 709/227 |
| 2006/0288230 A1* | 12/2006 | Crall et al. | 713/183 |
| 2007/0008937 A1 | 1/2007 | Mody et al. | |
| 2007/0044144 A1* | 2/2007 | Knouse et al. | 726/8 |
| 2007/0083655 A1* | 4/2007 | Pedersen | 709/226 |
| 2007/0180122 A1* | 8/2007 | Barrett | H04L 67/14 709/227 |
| 2007/0180503 A1* | 8/2007 | Li et al. | 726/5 |
| 2007/0192543 A1* | 8/2007 | Naik | H04L 47/2441 711/133 |
| 2008/0010665 A1* | 1/2008 | Hinton | G06F 21/41 726/1 |
| 2008/0189793 A1* | 8/2008 | Kirkup | G06F 21/53 726/27 |
| 2009/0037998 A1* | 2/2009 | Adhya et al. | 726/11 |
| 2009/0249440 A1* | 10/2009 | Platt | H04L 63/0815 726/1 |
| 2010/0094981 A1* | 4/2010 | Cordray et al. | 709/222 |
| 2010/0242092 A1* | 9/2010 | Harris et al. | 726/3 |
| 2011/0185202 A1* | 7/2011 | Black et al. | 713/320 |
| 2012/0011567 A1* | 1/2012 | Cronk et al. | 726/4 |
| 2012/0023554 A1* | 1/2012 | Murgia et al. | 726/4 |
| 2012/0179744 A1* | 7/2012 | Sullivan et al. | 709/203 |
| 2012/0284767 A1* | 11/2012 | Hockings et al. | 726/1 |
| 2013/0047263 A1* | 2/2013 | Radhakrishnan | 726/27 |
| 2013/0073703 A1* | 3/2013 | Das et al. | 709/223 |
| 2013/0167211 A1* | 6/2013 | Kamat | H04L 63/20 726/7 |

OTHER PUBLICATIONS

Khattak, Zubair Ahmad, Suziah Sulaiman, and J. A. Manan. "A study on threat model for federated identities in federated identity management system." Information Technology (ITSim), 2010 International Symposium in. vol. 2. IEEE, 2010.*
Czajkowski, Karl, et al. "Grid information services for distributed resource sharing." High Performance Distributed Computing, 2001. Proceedings. 10th IEEE International Symposium on. IEEE, 2001.*
Author Unknown, "Session Timeout Configuration," Aquafold, no date, 2 pages.
Author Unknown, "Setting the session timeout for the administrative console," IBM, 2010, 2 pages.
Avaya, "Avaya Aura® System Manager 6.1 SP4 Release Notes," Issue 2.0, Aug. 30, 2011, 39 pages.
Cisco, "Cisco NAC Appliance—Clean Access Manager Installation and Configuration Guide," Release 4.1(6), Nov. 2008, 590 pages.
Ma, S., "Session Timeout 101," The Ironside Group, Jun. 27, 2011, 6 pages.

* cited by examiner

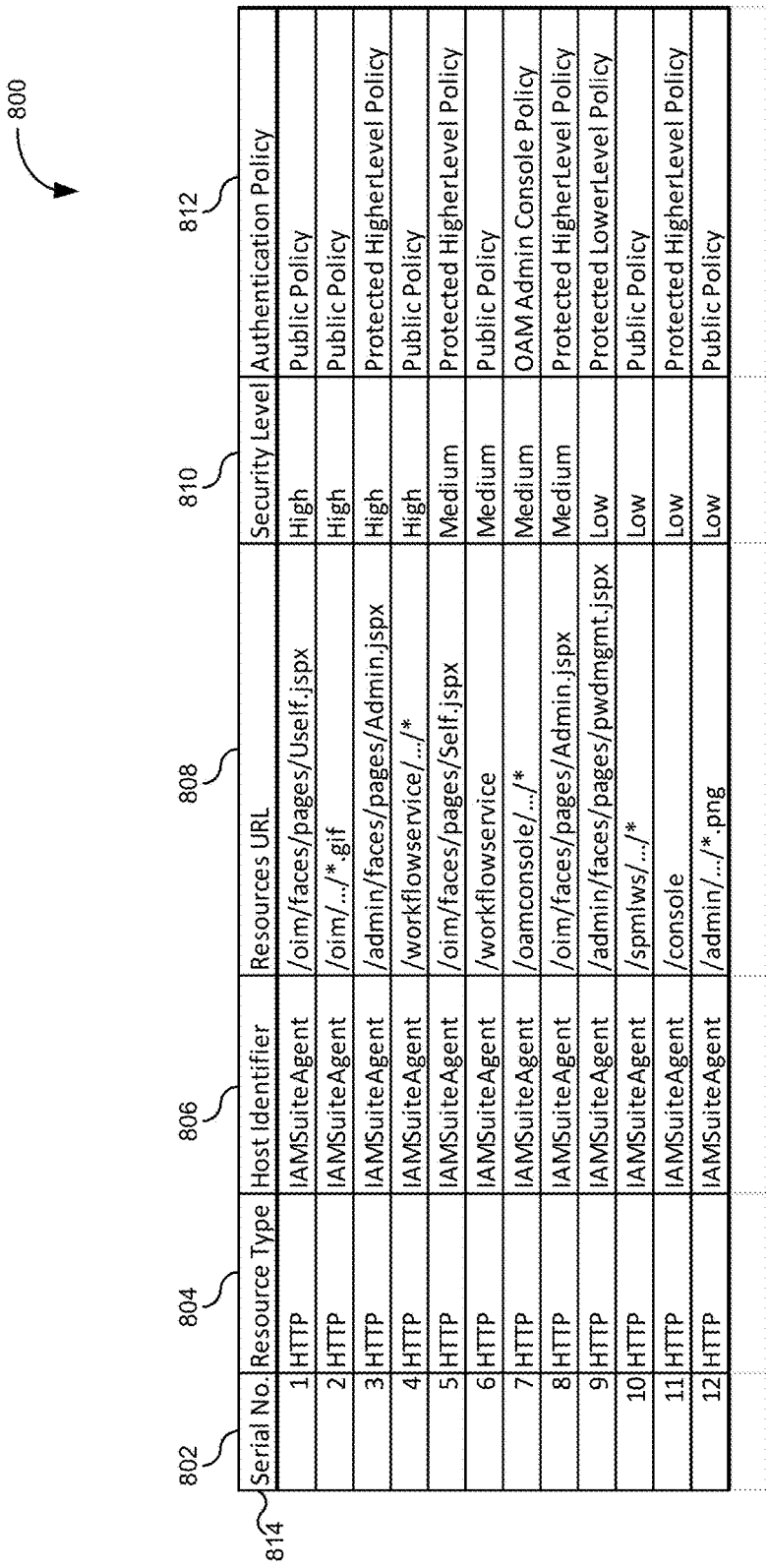

FIG. 8

| Serial No. | Resource Type | Host Identifier | Resources URL | Security Level | Authentication Policy |
|---|---|---|---|---|---|
| 1 | HTTP | IAMSuiteAgent | /oim/faces/pages/Uself.jspx | High | Public Policy |
| 2 | HTTP | IAMSuiteAgent | /oim/.../*.gif | High | Public Policy |
| 3 | HTTP | IAMSuiteAgent | /admin/faces/pages/Admin.jspx | High | Protected HigherLevel Policy |
| 4 | HTTP | IAMSuiteAgent | /workflowservice/.../* | High | Public Policy |
| 5 | HTTP | IAMSuiteAgent | /oim/faces/pages/Self.jspx | Medium | Protected HigherLevel Policy |
| 6 | HTTP | IAMSuiteAgent | /workflowservice | Medium | Public Policy |
| 7 | HTTP | IAMSuiteAgent | /oamconsole/.../* | Medium | OAM Admin Console Policy |
| 8 | HTTP | IAMSuiteAgent | /oim/faces/pages/Admin.jspx | Medium | Protected HigherLevel Policy |
| 9 | HTTP | IAMSuiteAgent | /admin/faces/pages/pwdmgmt.jspx | Low | Protected LowerLevel Policy |
| 10 | HTTP | IAMSuiteAgent | /spmlws/.../* | Low | Public Policy |
| 11 | HTTP | IAMSuiteAgent | /console | Low | Protected HigherLevel Policy |
| 12 | HTTP | IAMSuiteAgent | /admin/.../*.png | Low | Public Policy |

HIERARCHICAL CRITERIA-BASED TIMEOUT PROTOCOLS

BACKGROUND

Many large organizations have thousands of resources available for their employees and customers to use. These resources may be segregated and stored in various application domains that restrict access to the resources, effectively keeping them separate. In order to access the resources, a user or employee must go through a system known as an access manager. An access manager may comprise an enterprise-level solution that centralizes critical access control services to provide an integrated solution for authentication, authorization, Web single sign-on, policy administration, enforcement agent management, session control, systems monitoring, reporting, logging, and auditing. An access manager may control access for numerous users located in various locations. Further, access manager may be associated with numerous application domains, and may control access to each of the individual resources within the application domains.

After a user has been authenticated and authorized to access the resource, an authenticated session may be established. However, the nature of threats to the enterprise has become more sophisticated—witness the rise of malware, session hijacking, botnets, social engineering, phishing, pharming, and keyboard logging, to name a few. Security in today's dynamic business environment must not only be nimble enough to adapt to these external threats but it must also protect against internal threats as well. Passive security and compliance measures are no longer good enough for today's complex and ever changing security climate.

BRIEF SUMMARY

In one embodiment, a method of applying a timeout protocol by an access manager to a plurality of resources that are spread across a plurality of separate application domains is presented. The method may include storing the timeout protocol, where the timeout protocol may comprise at least one criterion. The method may further include receiving a request for a first resource in the plurality of resources. In one embodiment, each of the plurality of resources can be segregated into at least one of the plurality of separate application domains, the first resource can be associated with a first attribute, and the first attribute can be assigned a first value. The method may also include determining that the first value satisfies the at least one criterion, and associating the timeout protocol with the first resource. The method may additionally include associating the timeout protocol with each resource in the plurality of resources that is associated with the first attribute, and has the first attribute is assigned a value that satisfies the at least one criterion. The method may further include granting access to the first resource according to the timeout protocol.

According to another embodiment, a computer-readable memory is presented. The computer-readable memory may have stored thereon a sequence of instructions which, when executed by one or more processors, causes the one or more processors to apply a timeout protocol by an access manager to a plurality of resources that are spread across a plurality of separate application domains by storing the timeout protocol, where the timeout protocol comprises at least one criterion. The instructions may also cause the one or more processors to operate by receiving a request for a first resource in the plurality of resources. In one embodiment, each of the plurality of resources can be segregated into at least one of the plurality of separate application domains, the first resource can be associated with a first attribute, and the first attribute can be assigned a first value. The instructions may additionally cause the one or more processors to operate by determining that the first value satisfies the at least one criterion, and associating the timeout protocol with the first resource. The instructions may further cause the one or more processors to operate by associating the timeout protocol with each resource in the plurality of resources that is associated with the first attribute, and has the first attribute is assigned a value that satisfies the at least one criterion. The instructions may also cause the one or more processors to operate by granting access to the first resource according to the timeout protocol.

According to yet another embodiment, a system is presented. The system may include one or more processors, and a memory communicatively coupled with and readable by the one or more processors and having stored therein a sequence of instructions which, when executed by the one or more processors, cause the one or more processors to apply a timeout protocol by an access manager to a plurality of resources that are spread across a plurality of separate application domains by storing the timeout protocol, where the timeout protocol comprises at least one criterion. The instructions may also cause the one or more processors to operate by receiving a request for a first resource in the plurality of resources. In one embodiment, each of the plurality of resources can be segregated into at least one of the plurality of separate application domains, the first resource can be associated with a first attribute, and the first attribute can be assigned a first value. The instructions may additionally cause the one or more processors to operate by determining that the first value satisfies the at least one criterion, and associating the timeout protocol with the first resource. The instructions may further cause the one or more processors to operate by associating the timeout protocol with each resource in the plurality of resources that is associated with the first attribute, and has the first attribute is assigned a value that satisfies the at least one criterion. The instructions may also cause the one or more processors to operate by granting access to the first resource according to the timeout protocol.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 8 illustrates a table stored in a memory that includes resource identifiers, attributes, and values, according to one embodiment.

DETAILED DESCRIPTION

Figure 1:
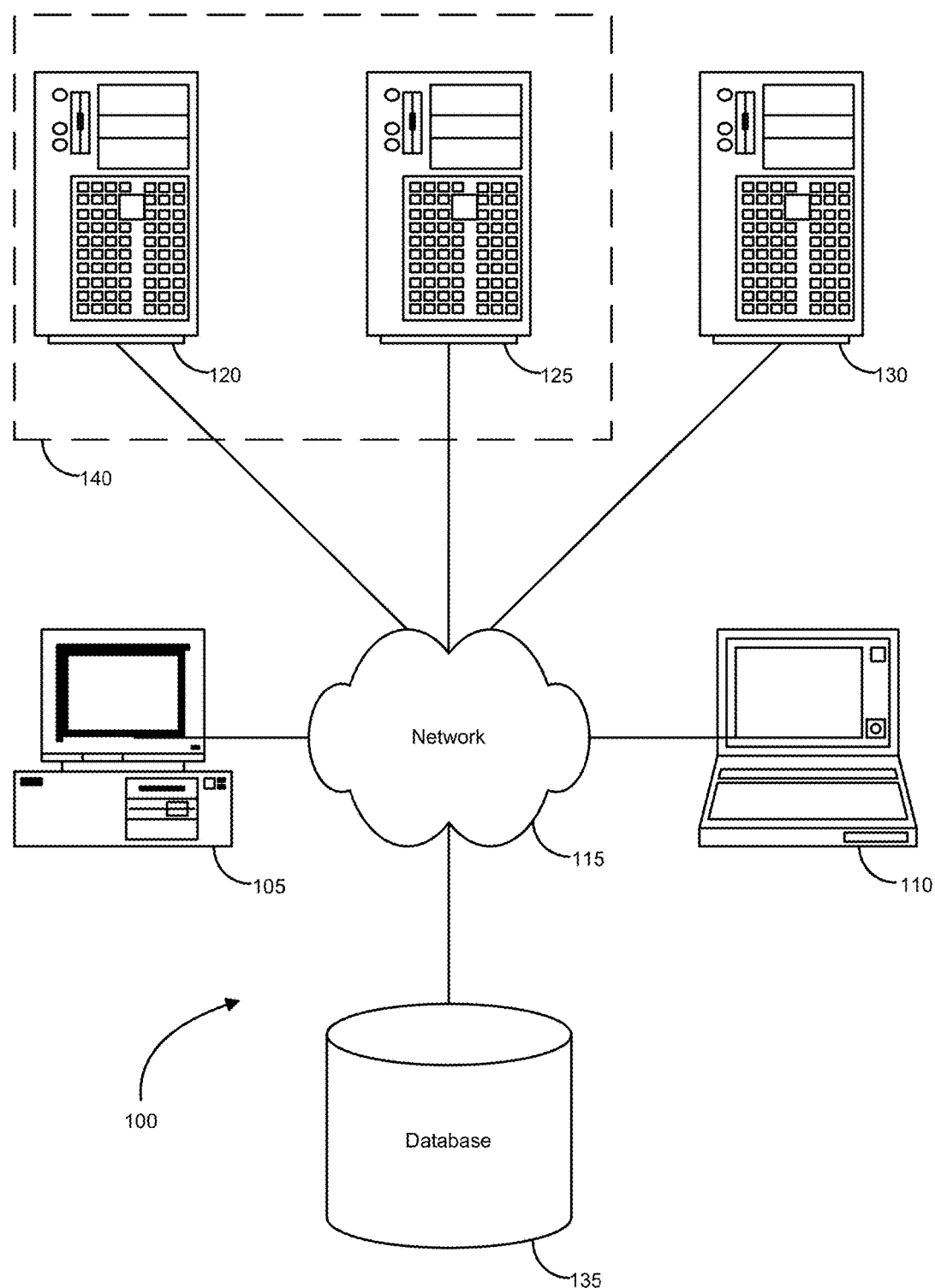
FIG. 1 illustrates a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for applying timeout protocols based on resource attributes and criteria. When requests for resources received by an access manager, the attributes of that resource may be analyzed to determine if they satisfy the criteria of one or more timeout protocols. By assigning timeout protocols based on criteria and attributes, an administrator can have more dynamic and flexible control over the security of a large number of resources. Various levels of timeout protocols are described, which can be arranged into a hierarchy and applied selectively based on the particular embodiments.

As used herein, the term "timeout protocol" may comprise a protocol that determines when an authenticated session between a user and a resource should be terminated. The timeout protocol may be applied by an access manager, such as the Oracle Access Manager 11g® available from Oracle® International Corporation.

Each of the embodiments disclosed herein may be implemented in one or more computer systems. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
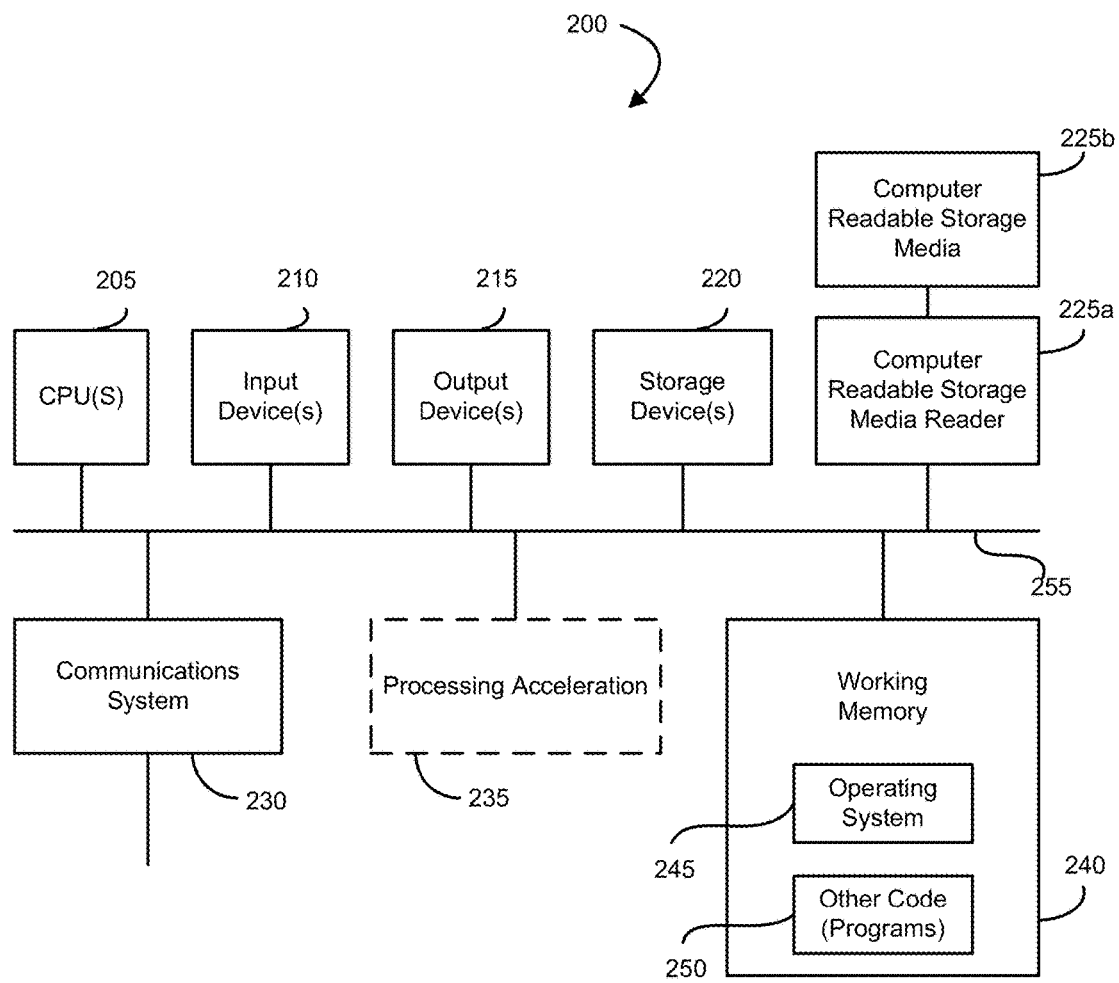
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods and systems may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 3:
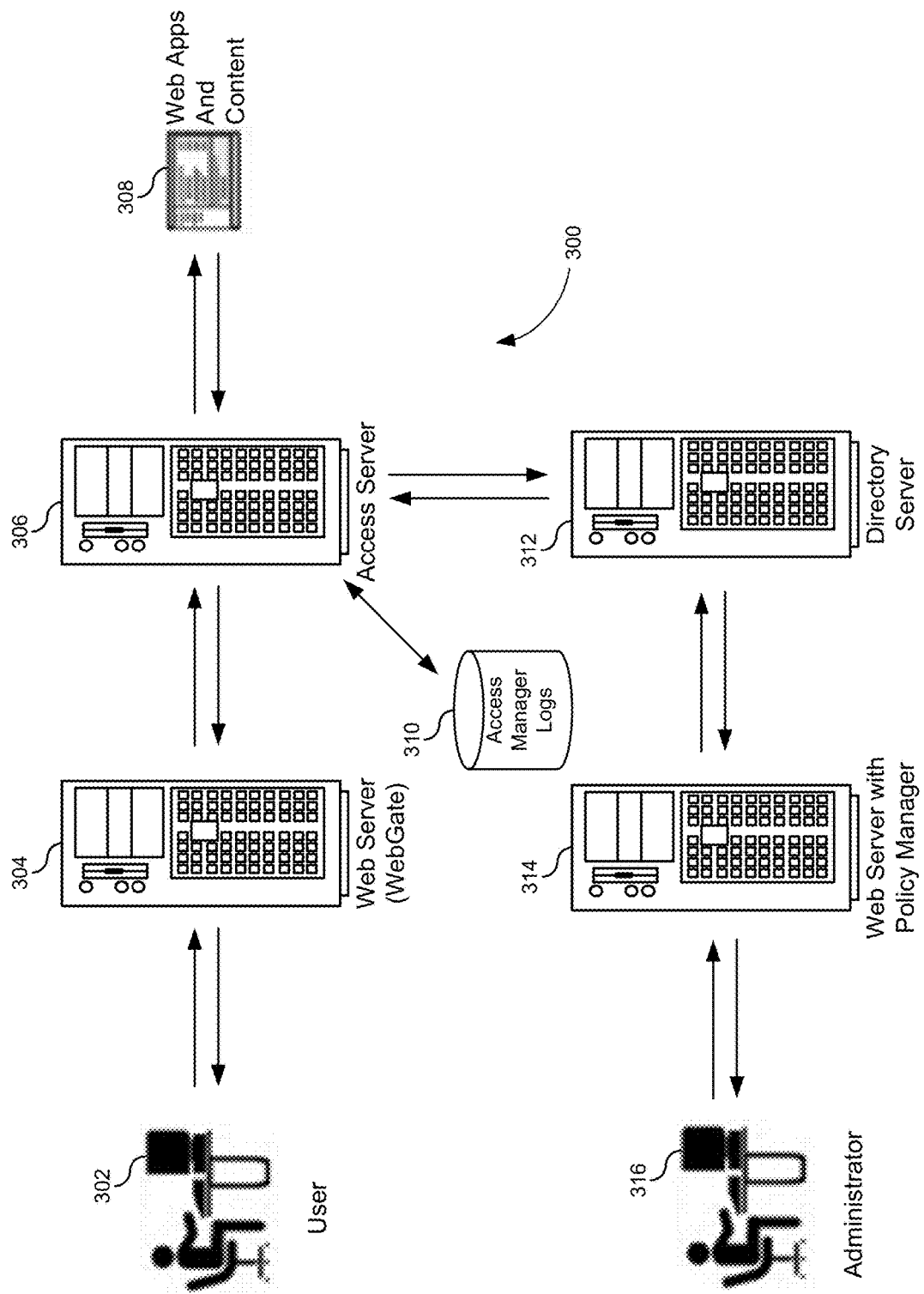
FIG. 3 illustrates a simplified block diagram of an environment for using an access manager, according to one embodiment.

FIG. 3 illustrates a simplified block diagram 300 of an environment for using an access manager, according to one embodiment. A user 302 may send a request to an organization. In many cases, organizations will use a system of servers built with the components described earlier in FIG. 1 and FIG. 2. In this example, a Web server 304 may receive the request from the user 302. The Web server 304 can operate using a software component referred to as a WebGate, which is a Web server plug-in that intercepts HTTP requests from users intending to access a web resource. The WebGate then forwards the request to an access server 306 for authentication and/or authorization.

The access server 306 can operate using a software component referred to as an access manager. The access manager can provide dynamic policy evaluation services for both web-based and non-web-based resources and applications. The access manager receives the request from the Web server 304 and then queries a directory server 312 for authentication, authorization, and/or auditing rules. In one embodiment, communication between the access server 306 and the directory server 312 uses the Light-weight Directory Access Protocol (LDAP).

The directory server 312 can communicate with Web server 314. Web server 314 can operate using software components referred to as a policy manager. Administrators can use the policy manager to define resources to be protected by the access manager. The policy manager can communicate with the directory server 312, which can write policy data. The policy manager communicates with the access server 306 through the directory server 312 to update any policies that are created and/or modified. In one embodiment, the policy manager operating on Web server 314 may include various software sub-modules, including an authentication module, an authorization module, an auditing module, and a session management module.

An administrator may use an access system console 316 to configure various access protocols using the policy manager. Other operations may be carried out at the access system console 316, such as defining policies, modifying policies, associating resources with policies, monitoring system usage, and/or the like. The access system console 316 may also be used to view and analyze system logs. A database 310 may be used to record requests, authorizations, traffic, denials, messages, data transmissions, errors, or any other types of information that pass through the access server 306.

If the access manager operating on the access server 306 determines that the user 302 is authenticated and authorized properly, the access manager may provide access to one or more resources 308. If the access manager determines that the user 302 has failed to provide the necessary authentication and/or authorizations, access to the one or more resources 308 may be denied. If accepted, the access manager may initiate an authenticated session wherein the user 302 has access to the one or more resources 308 as defined by a policy. The policy may limit actions that can be taken by the user related to the one or more resources 308.

It will be understood that the environment for using access manager 300 illustrated in FIG. 3 is merely exemplary. Many other components, such as additional servers, multiple users, multiple administrators, as well as different types of requests and resources, may be implemented in similar systems. In one exemplary embodiment, the one or more resources 308 may be divided into a plurality of application domains. An application domain is a mechanism (similar to a process in an operating system) that can be used to isolate executed software applications from one another. This may prevent applications operating in different application domains from affecting each other. Generally, each application domain can have its own virtual address space that scopes the resources for the application domain using that address space. Additionally, each application domain can have its own authorization and authentication policies to govern access to resources within the application domain.

Figure 4:
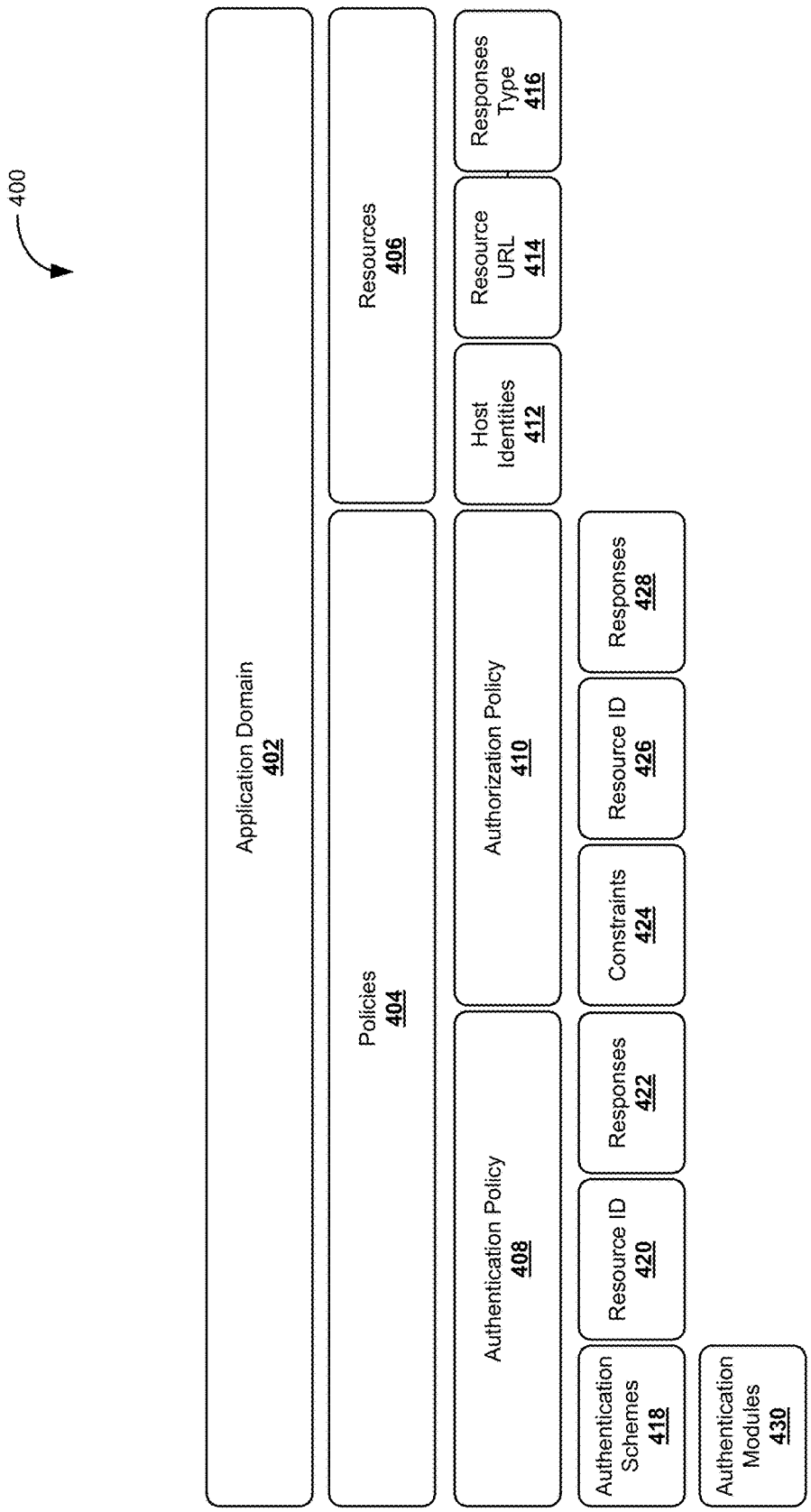
FIG. 4 illustrates a simplified organizational chart of an application domain, according to one embodiment.

FIG. 4 illustrates a simplified organizational chart 400 of an application domain, according to one embodiment. An application domain 402 can include both policies 404 and resources 406. The resources 406 can comprise actual content objects or, alternatively, metadata that describes resources. For example, each of the resources 406 could include a host identity 412, a resource URL 414, and a response type 416.

The policies 404 can include at least an authentication policy 408 and an authorization policy 410. The authentication policy 408 can be used to confirm the identity of a person or software program attempting to access the resources 406 within the application domain 402. The authentication policy 408 can include a number of authentication schemes 408 that describe how authentication procedures should be implemented. The authentication policy 408 may also include a resource ID 420 identifying resources covered by the authentication policy 408, along with responses 422 related to the authentication policy 408. Software modules referred to as authentication modules 430 may also be used to implement the authentication policy 408.

Similarly, the policies 404 can include an authorization policy. The authorization policy 410 determines whether an authenticated user is authorized to access the resources. Like the authentication policy 408, the authorization policy 410 can include a list of resource IDs 426 for which the authorization policy 410 should be applied. Also included may be a list of constraints 424. An authorization constraint is a rule that grants or denies access to a particular resource based on the context of the request for that resource. An authorization constraint can define the obligations and/or requirements that must be fulfilled before responding to a client's request. Evaluation of constraints determines if the authorization policy applies to the incoming request. For example, one class of constraints may specify who is authorized to access a protected resource. Similarly, a second class of constraints can specify explicitly who is denied access to the protected resource.

Finally, the authorization policy 410 can include a set of responses 428. Administrators can define responses that declare the actions that must be fulfilled after successful authorization (or authentication). Typically, data is returned to the requesting client. Policy responses enable the insertion of information into a session or application and the ability to withdraw the information at a later time. Depending on the responses specified for authentication or authorization success or failure, the requesting client might be redirected to a specific URL, or user information might be passed on to other applications through a header variable or cookie value.

If the request is both authorized and authenticated, an authenticated session will be initialized between the requesting client and the requested resource. The authenticated session will follow any applicable authentication policy constraints. In the embodiments described herein, a particular authentication policy of interest is the timeout protocol. Typically, authenticated sessions will include a timeout protocol to maintain the security of the resource. In previous solutions, administrators were able to set a timeout protocol globally for every resource accessed through an access manager. Alternatively, administrators were able to set individual timeout protocols for individual resources. However, as described earlier, embodiments of the present invention provide for methods and systems which allow a timeout protocol to be applied across multiple application domains based on a set of criteria.

Figure 5:
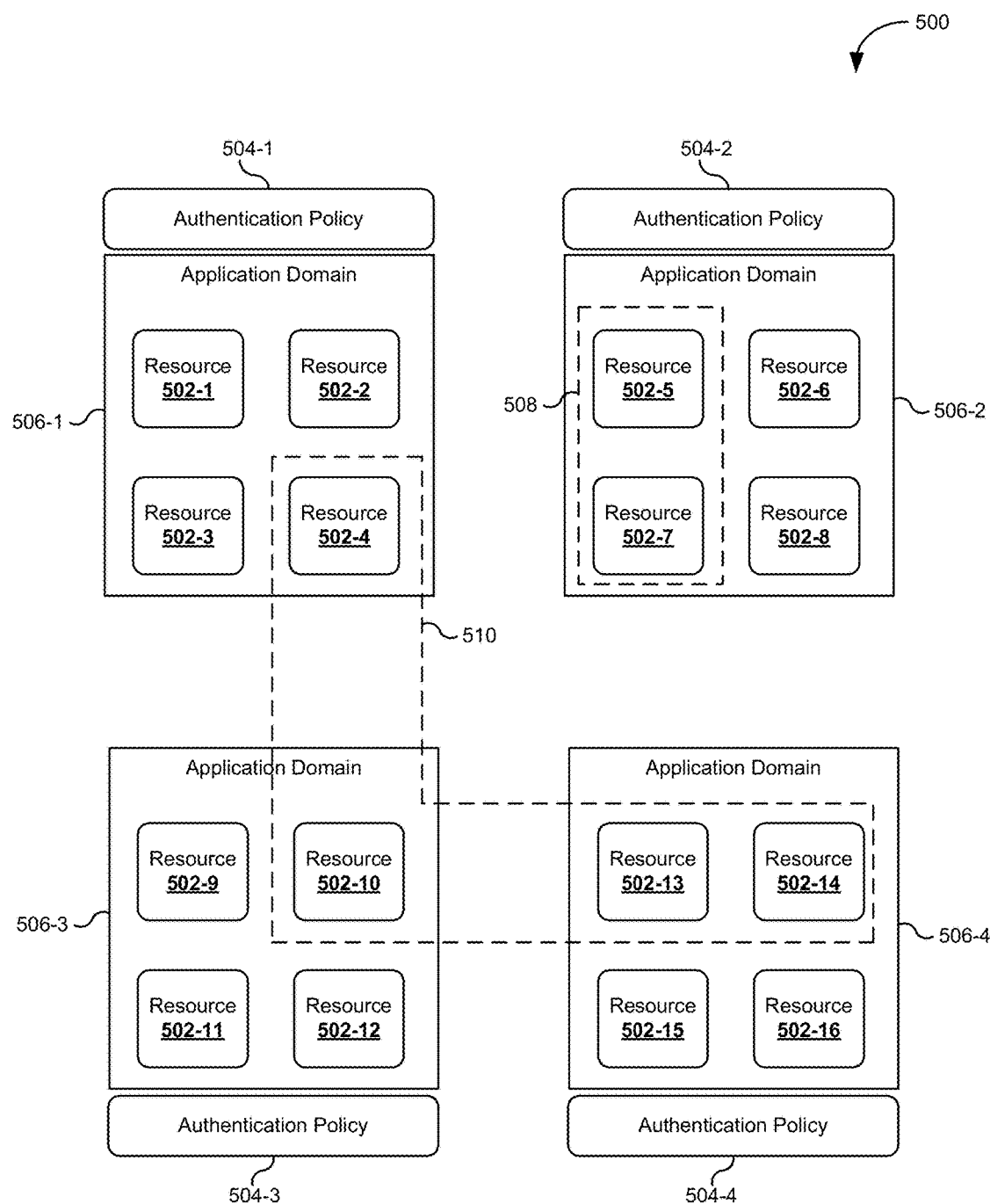
FIG. 5 illustrates a simplified block diagram of timeout protocols that are applied across application domains, according to one embodiment.

FIG. 5 illustrates a simplified block diagram 500 of timeout protocols that are applied across application domains, according to one embodiment. A single access manager may control access to a plurality of application domains 506. Each of the plurality of application domains 506 can include an authentication policy 504. For example, application domain 506-1 may be associated with authentication policy 504-1. Note that, in this example, each application domain 506 is paired with a single authentication policy 504. However, it will be understood in light of the discussion above that each application domain 506 can be associated with a number of different authentication policies 504. Furthermore, a particular authentication policy 504 may be associated with more than one application domain, such as application domain 506-1 and application domain 506-2.

Each authentication policy 504 can include a timeout protocol. In one embodiment, the access manager may enforce a timeout protocol that spans various application domains 506 and authentication policies 504. For example, timeout protocol 510 may be applied to resource 502-4, resource 502-10, resource 502-13, and resource 502-14. Note that in the absence of timeout protocol 510, the only other way to enforce the same timeout protocol on each of these resources would be to set a timeout protocol for each resource individually.

In a second example, a timeout protocol may include a subset of resources within a single application domain. For example, timeout protocol 508 is applied to resource 502-5 and resource 502-7. Both resource 502-5 and resource 502-7 are members of application domain 506-2.

Figure 6:
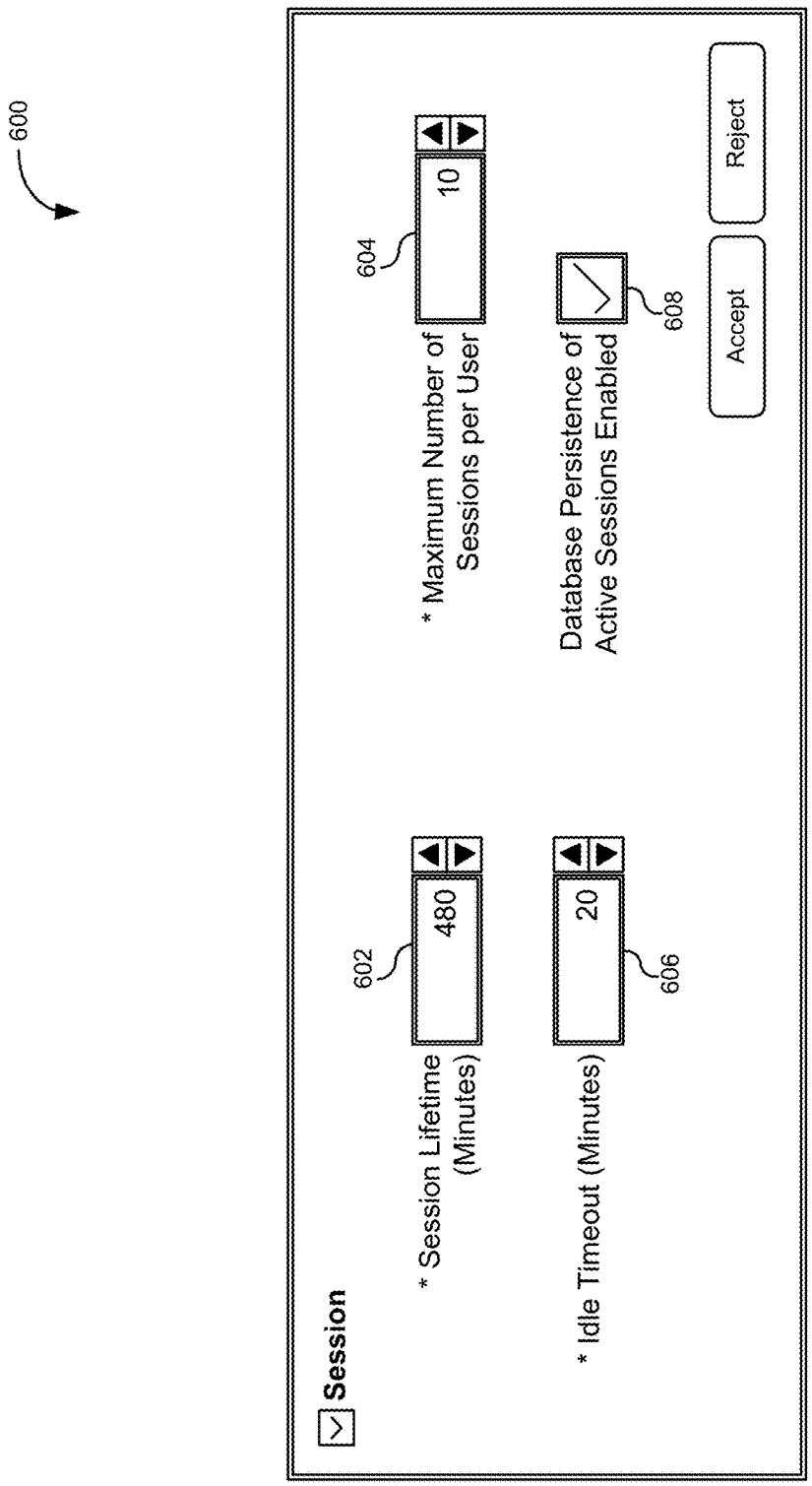
FIG. 6 illustrates an exemplary interface for defining a timeout session protocol, according to one embodiment.

FIG. 6 illustrates an exemplary interface 600 for defining a timeout session protocol, according to one embodiment. Interface 600 also illustrates one example of the specifications that may be included within a timeout protocol. For example, interface 600 includes a session lifetime selection 602 that can be used to define the maximum number of minutes a session should be left open. This value may be applied to sessions that are both active and idle.

Additionally, interface 600 can include an idle timeout selection 606. This can be used to define the maximum number of minutes a session should be allowed to remain idle. This can be used to close a session before the session lifetime expires. This may be particularly useful in cases where a user has left his/her workstation during an authenticated session and forgot to terminate the session properly. The idle timeout will typically be less than the session lifetime.

Interface 600 may also include a maximum number of sessions per user selection 604. This may be used to limit the number of authentications sessions that can be initialized by a single user. Finally, a user may be able to select whether database persistence of the activated session should be enabled using selector 608.

Figure 7:
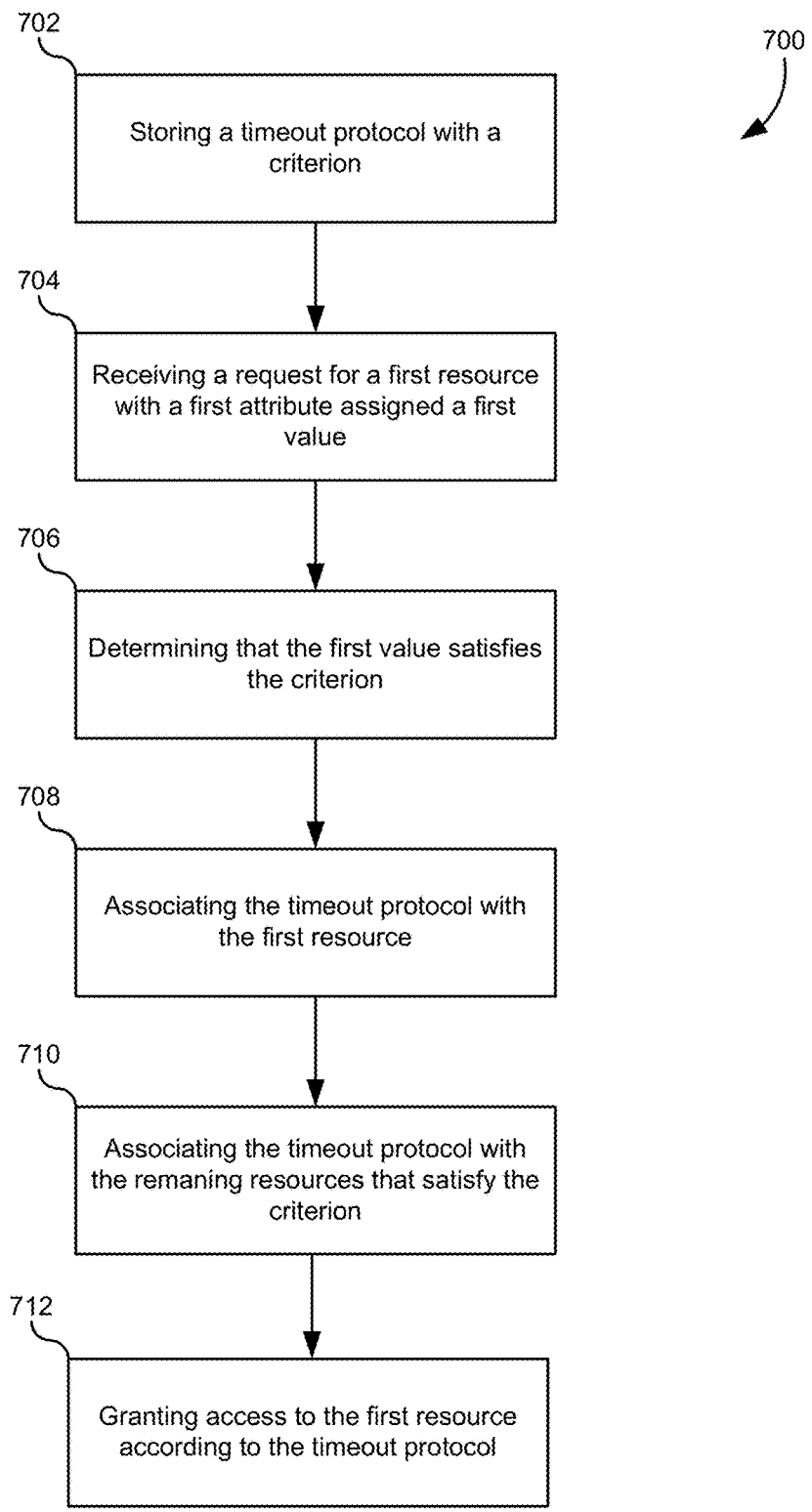
FIG. 7 illustrates a method of applying a timeout protocol by an access manager to a plurality of resources that are spread across a plurality of separate application domains, according to one embodiment.

FIG. 7 illustrates a simplified flowchart 700 of a method of applying a timeout protocol by an access manager to a plurality of resources that are spread across a plurality of separate application domains, according to one embodiment. The method may include storing the timeout protocol (720). In one embodiment, the timeout protocol comprises at least one criterion. The criterion may be any logical expression that can be used to determine if a particular resource should use the timeout protocol. The timeout protocol can include specifications for the maximum session length, the maximum idle time, and/or the maximum number of authenticated sessions allowed for each user. In one embodiment, the criterion involves an attribute and a value, along with the logical operator. The attribute can be an attribute that is assigned to one or more resources protected by the access manager. In other embodiments, there may be more than one criterion associated with the timeout protocol, such that the timeout protocols are associated with criteria.

The method may further include receiving a request for a first resource in the plurality of resources (704). The request may come from a single user at a workstation or may alternatively come from an automated system connected to the access manager. The request may include user credentials, authentication tokens, passwords, and/or other information that can be used to authenticate the identity of user. The request may also contain security credentials that may be used to authorize the request. The request may be for a single resource or for a plurality of resources. If the request is for more than one resource, the resources may span across various application domains. In other words, each of the plurality of resources can be segregated into at least one of a plurality of separate application domains.

In one embodiment, the request is for a single resource, which may be referred to as a "first resource." It will be understood that the term "first resource" is merely used to differentiate the first resource from the remaining resources in the plurality of resources. It is not necessarily used to imply an order of the resources. The first resource may be associated with a first attribute. Attribute can be any characteristic, description, and/or value assigned to the resource. The first attribute may include metadata, file names, file types, application domains, and/or the like. The first attribute may be an inherent part of the resource. Alternatively, the first attribute may be a user-defined attribute that has been defined by an administrator. In one embodiment, the first attribute comprises a special attribute that is only used to determine the timeout protocol.

In one embodiment, the first attribute may be assigned a first value. The first value may typically correspond to any value that can be assigned to the first attribute. For example, for an attribute titled "file type," the first value could be descriptive of a text file, an HTML file, an executable file, a stylesheet, a directory, and/or the like. In another example, an attribute titled "security level" could include a first value of low, medium, or high. It should be emphasized, that only a few examples are listed here for brevity. It will be understood in light of this disclosure that any attributes and values may be used by embodiments described herein. Any information associated with the first resource can be used as either the first attribute or the first value.

The method may further include determining that the first value satisfies the criterion (706). In an embodiment, the criterion includes an attribute, a value, and a logical operator. Here, the first value may be determined to satisfy the criterion if the attribute specified by the criterion matches the first attribute and if the value of the criterion is related to the first value according to the logical expression. For example, the criterion may specify that only resources with a database file type should be associated with the timeout protocol. The criterion could check the first resource and determine whether it had an attribute named "file type" and whether the associated value equaled "database."

More complicated criteria can be used by various embodiments. For example, a criterion could require that a user belong to certain access lists. A criterion could require that a user be associated with a certain department. A criterion could require that a resource be associated with certain permissions. A criterion could require that a user be logged in at a certain location. A criterion could require that a certain authentication scheme is used. A criterion could require that a file be located within a specific application domain. Just as attributes and values can include any information associated with the resource, both inherent and user defined, so can a criteria involve any information about the attributes and values. The examples discussed herein are not meant to be limiting.

The method may further include associating the timeout protocol with the first resource (708). The method may also include associating the timeout protocol with each resource in the plurality of resources that is associated with the first attribute, where the first attribute is assigned a value and the value satisfies the criterion of the timeout protocol (710). In one embodiment, a timeout protocol may be defined by an administrator using an interface, such as interface 600. After the timeout protocol is defined, it may be immediately checked against existing resources protected by the access manager. Any resources that have attribute/value pairs that satisfy the criterion may be flagged, or otherwise identified, as being associated with the timeout protocol. Alternatively, resources can be associated with the timeout protocol at the time they are accessed. This may be advantageous where the timeout protocol and/or the criterion are often updated or modified. In this case, when the first resource is requested, a list of timeout protocols can be analyzed, and any applying to the first resource can be associated with the first resource.

In embodiments where multiple criteria are used instead of a single criterion, each of the criteria can be matched against the attribute/value pairs for each resource protected by the access manager. In one embodiment, only a single criterion must be satisfied for the entire timeout protocol to be applied. In another embodiment, every criterion of a timeout protocol must be satisfied in order for the timeout protocol to be applied.

In another embodiment, groups of resources may be listed in the request for the first resource. In this case, if the criterion is satisfied by any of the resources and the request, then the timeout protocol can be applied. Alternatively, if a group of resources is requested, then each resource in the request must satisfy the criterion in order for the timeout protocol to be applied.

In cases where an application manager is enforcing multiple timeout protocols, it is conceivable that the first value in the first attribute will satisfy a criterion for a number of different timeout protocols. In one embodiment, the most restrictive of these protocols will be enforced during authenticated session. In another embodiment, the least restrictive of these timeout protocols will be enforced for the authenticated session. In yet another embodiment, each of the limitations specified by the timeout protocols may be compared, and a new pro-timeout protocol may be derived from the individual limitations of multiple timeout protocols. For example, a new timeout protocol could include a maximum session time from a first timeout protocol, a maximum idle time from a second timeout protocol, and a maximum number of user sessions from a third timeout protocol. Each value may be chosen according to which is the most restrictive or least restrictive, depending on the particular embodiment.

In one embodiment, timeout protocols may comprise different limitations. For example, a first timeout protocol may include only a maximum session time, whereas a second timeout protocol may include only a maximum idle time. If the criteria for both the first timeout protocol and the second timeout protocol are satisfied by the first resource, then a new timeout protocol may be created and applied that includes the maximum session time from the first timeout protocol and the maximum idle time from the second timeout protocol. Many other combinations of timeout protocols are possible, depending on the particular embodiment.

In another embodiment, multiple timeout protocols may be active during a single authenticated session. Each of the timeout protocols may be applied to resources individually. Therefore, access to individual resources may expire without regard to other timeout protocols that are still active. For example, a user may request access to a first and second resource, each having a different timeout protocol. If the first timeout protocol expires before the second, then the user may have his/her access restricted to the first resource, while continuing to have access to the second resource.

The method may additionally include granting access to the first resource according to the timeout protocol (712). In one embodiment, the timeout protocol may be applied to the entire authenticated session. In another embodiment, if the user requests a second resource associated with a second timeout protocol, the first timeout protocol and the second timeout protocol may be compared, and a determination may be made as to which timeout protocol should govern the remainder of the authenticated session. Additionally, accessing a separate resource may require the user to provide additional security credentials.

In one embodiment, when an authenticated session is terminated based on a timeout protocol, a message may be supplied to the user. The user may be provided an opportunity to reinitialize the authenticated session, and the timeout protocol may be reapplied. In one embodiment, the user may be required to make a second request for the first resource in order to initialize the session. In one embodiment, the timeout protocol may be arranged with other timeout protocols hierarchically. For example, if a first timeout protocol operates to terminate an authenticated session and the user makes a subsequent request for the same first resource, the first timeout protocol may be adjusted for the subsequent session. Alternatively, the first timeout protocol may be replaced with a second protocol in the hierarchy that is more restrictive. For example, if the first protocol has a maximum session time of 400 minutes, a subsequent request may reduce that time to 200 minutes or may be associated with a second timeout protocol with a more restrictive value.

In order to fine-tune the ways in which various timeout protocols can be associated with resources across a number of different application domains, dedicated attributes and values may be created. In other words, an attribute may be added to each resource within the various application domains, and the values assigned to the attribute may specify one or more of the timeout protocols that should be applied.

FIG. 8 illustrates a table 800 stored in a memory that includes resource identifiers, attributes, and values, according to one embodiment. Table 800 may be used to track all of the resources within a single application domain. In this example, each resource may be associated with a number of different attributes. The attributes may be represented by the top row 814 of table 800. For example, each resource may have attributes such as a serial number 802, a resource type 804, the host identifier 806, a resource URL 808, a security level attribute 810, and an authentication policy 812. It should be clear that table 800 is not a complete representation, and numerous items and fields have been excluded for brevity. Each resource may have a value assigned to each attribute in the remaining rows of table 800.

In this embodiment, security level attribute 810 may be specifically designed to determine which timeout protocol should be used. This may be a user-defined attribute since it applies to all types of resources. Furthermore, the security level attribute 810 may be used exclusively to determine a timeout protocol. In other embodiments, the security level attribute may be used by additional processes, such as an authentication process and an authorization process.

The security level attribute 810 may be assigned one of at least three values. In this example, the values that may be assigned are low, medium, and high. Other embodiments may use more than three values. As described above, if a user requests a first resource with a high security level, along with a second resource with a low security level, a high security level could be applied or vice versa.

Figure 9:
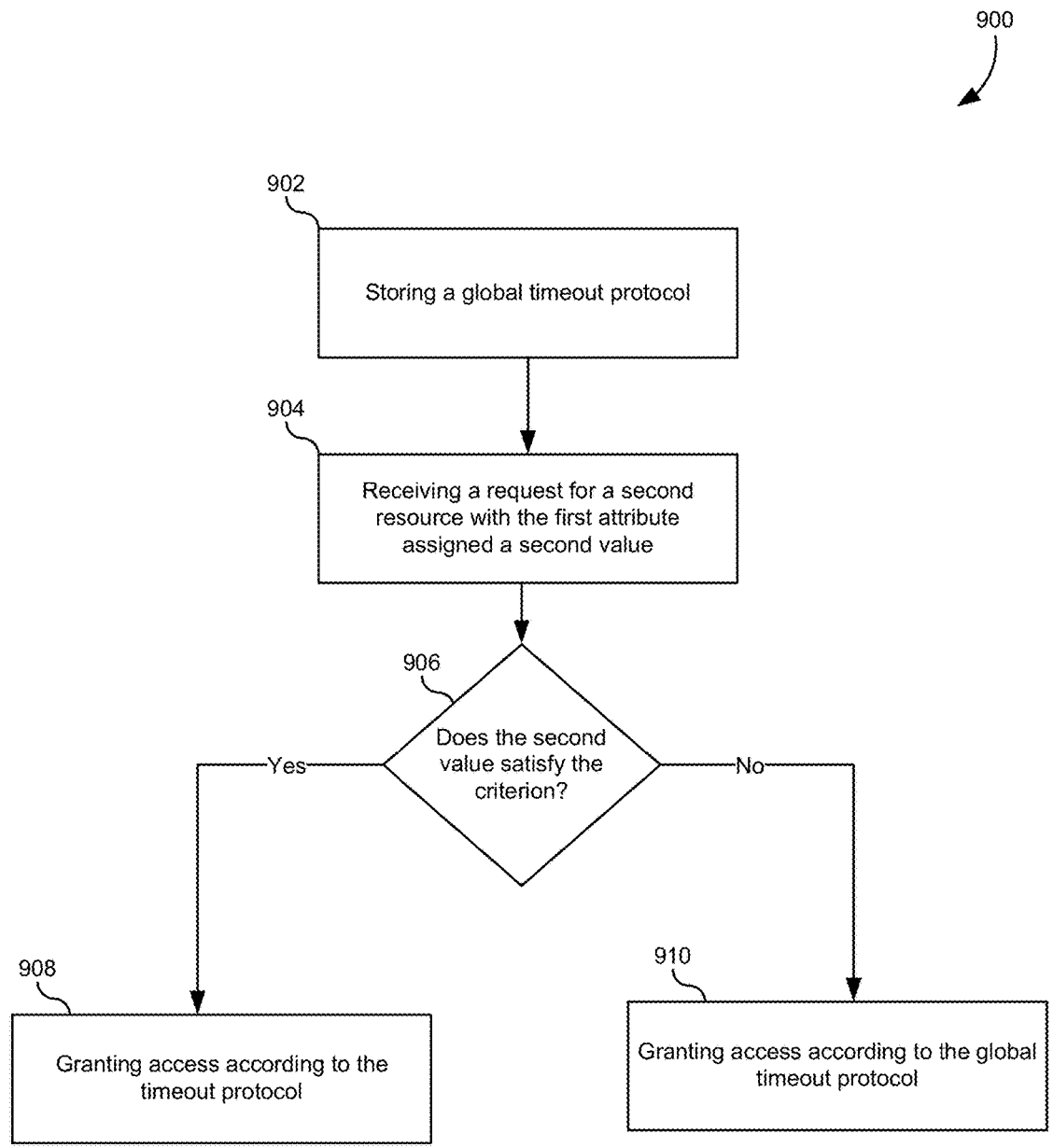
FIG. 9 illustrates a method of applying a timeout protocol where a global timeout protocol is also operative, according to one embodiment.

FIG. 9 illustrates a simplified flowchart 900 of a method of applying a timeout protocol where a global timeout protocol is also operative, according to one embodiment. The method may include storing a global timeout protocol (902). The global timeout protocol may be similar to the timeout protocol described in relation to FIG. 7. In other words, the global timeout protocol may be associated with a criterion or with criteria. The global timeout protocol may be established by an administrator and may be applied as a default setting for every resource that is protected by the access manager unless otherwise superseded.

The method may further include receiving a request for a second resource with the first attribute assigned a second value (904). In other words, it may be determined that the criterion of the global timeout protocol relates to the first attribute. However, in this case, a second value is assigned to the first attribute rather than the first value of the method in FIG. 7. The method may additionally include determining whether the second value satisfies the criterion of the original timeout protocol (906). If the second value, like the first value, satisfies the criterion of the original timeout protocol, then the method may include granting access to the second resource according to the original timeout protocol (908). Note that this case is simply applying the original timeout protocol to the second resource in the same way that was applied to the first resource without regard for the global timeout protocol because the second value still satisfies the criterion.

If the second value, unlike the first value, does not satisfy the criterion of the original timeout protocol, then the global timeout protocol may be applied. Therefore, the method may further include granting access to the second resource according to the global timeout protocol (910). In other words, if none of the specific timeout protocols apply, then the global timeout protocol may be applied as a default. In one embodiment, a specific timeout protocol may have its criterion satisfied, but the specific timeout protocol may be less restrictive than the global timeout protocol. In this case, it may be determined that the global timeout protocol should be applied instead of the specific timeout protocol. In other words, the global timeout protocol may be used as a floor. This may be useful in cases where the administrator would like to raise the security for all resources protected by access manager without affecting the individually defined timeout protocols during a high-security event. Once the high-security event is over, the global timeout protocol may be lowered such that the individually defined timeout protocols may again be applied.

Figure 10:
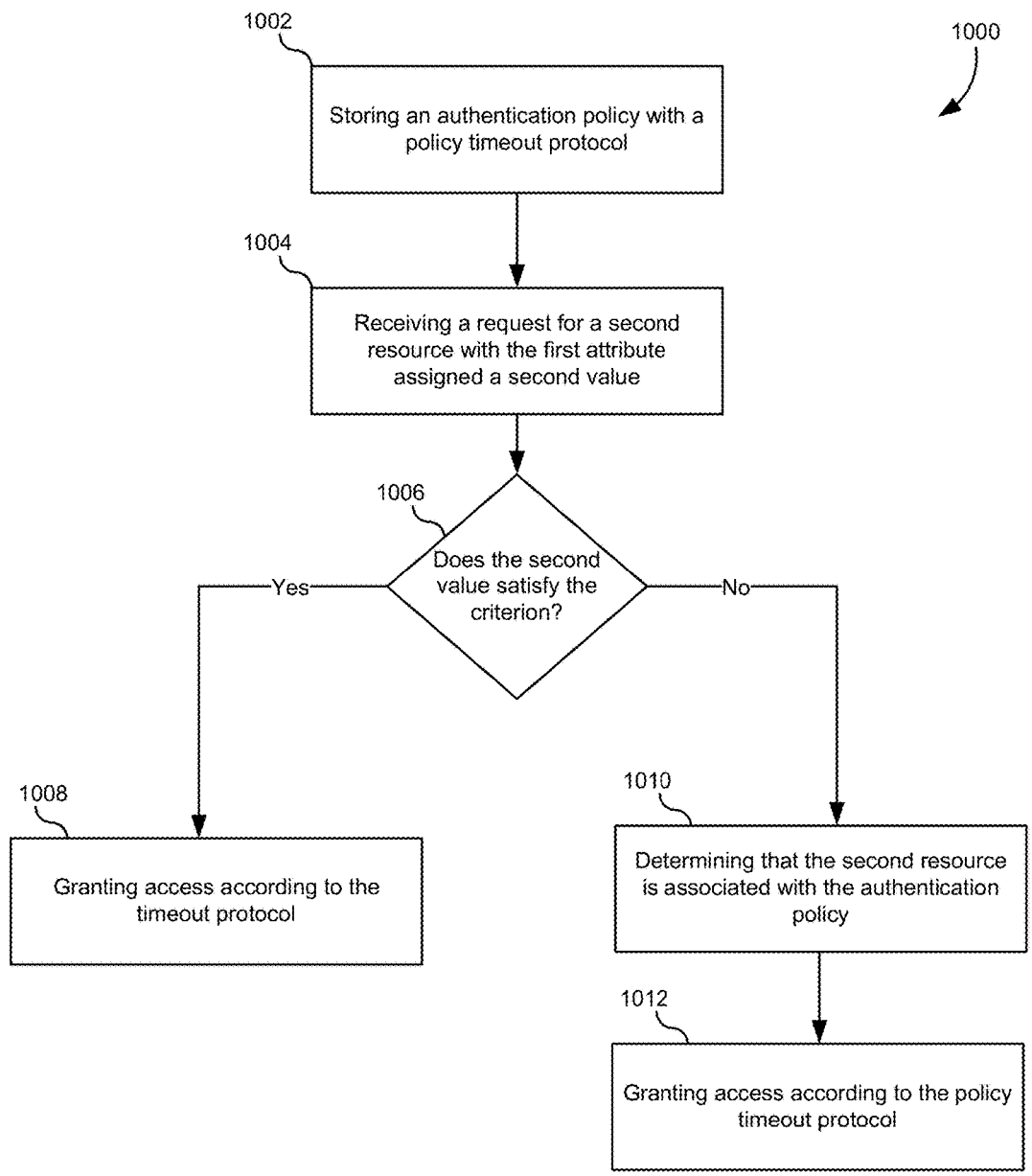
FIG. 10 illustrates a method of applying a timeout protocol where a policy timeout protocol is also operative, according to one embodiment.

FIG. 10 illustrates a simplified flowchart 1000 of a method of applying a timeout protocol where a policy timeout protocol is also operative, according to one embodiment. Much like the previous description of a global timeout protocol, each authentication policy may be associated with its own policy timeout protocol. In the event that any specific timeout protocols cannot be applied because their criteria are not met, a policy timeout protocol may be applied instead. The method in FIG. 10 may be considered a continuation of the method in FIG. 7. In other words, the request for the first resource has already been made, and the first timeout protocol has already been applied to an authenticated session. The method may include storing an authentication policy with a policy timeout protocol (1002). In one embodiment, the authentication policy may include numerous policy timeout protocols, each having their own criterion.

The method may also include receiving a request for a second resource with the first attribute assigned a second value (1004). It may then be determined whether the second value satisfies the criterion of the original timeout protocol (1006). If the criterion is satisfied by the second value, then access can be granted according to the original timeout protocol (1008). However, if is determined that the second value does not satisfy the criterion of the original timeout protocol, then the original timeout protocol will not be applied. Instead, it may be determined that the second resource is associated with the authentication policy (1010). This may be determined by virtue of where the second resource is stored and may be determined by referencing a table such as table 800 in FIG. 8. After it is determined that the second resource is associated with the authentication policy, access maybe granted to the second resource according to the policy timeout protocol of the authentication policy (1012).

As stated earlier, timeout protocols assigned to individual resources, timeout protocols assigned based on criteria, timeout protocols based on an authentication policy, and global timeout protocols may be arranged and applied hierarchically. For example, each of these four types of protocols may be applied to a single resource. In this case, the access manager will determine which timeout protocol should be applied or which parts of each timeout protocol should be applied to the authenticated session. In one embodiment, each timeout protocol may be assigned a precedence value. For example, timeout protocols assigned to individual resources may always receive the highest precedence. If a resource does not have an individual timeout protocol assigned, then timeout protocols based on criteria and attributes could be selected. If none of these apply, then a timeout protocol could be applied based on an authentication policy or a global setting.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of applying timeout protocols by an access manager to a plurality of resources that are spread across a plurality of separate application domains, the method comprising:
   storing a plurality of timeout protocols, wherein each of the plurality of timeout protocols:
   comprises at least one criterion specifying when the corresponding timeout protocol is to be applied to resources in the plurality of resources instead of domain-specific timeout protocols; and
   determines when an authenticated session between a user and a resource should be terminated;
   receiving a request for a first resource in the plurality of resources, wherein:
   each of the plurality of separate application domains enforces at least one domain-specific timeout protocol;
   the first resource has a first attribute; and
   the first attribute is assigned a first value;
   responsive to the request, determining that the first value satisfies the at least one criterion of a timeout protocol in the plurality of timeout protocols;
   based on determining that the first value satisfies the at least one criterion, applying the timeout protocol to the first resource;
   responsive to determining that the first value satisfies the at least one criterion of the timeout protocol, determining each resource in the plurality of resources that is associated with the first attribute and that has the first attribute assigned a value that satisfies the at least one criterion;
   applying the timeout protocol to each determined resource;
   enforcing the timeout protocol, by the access manager, on each determined resource in the plurality of the separate application domains, wherein the timeout protocol enforced by the access manager is distinct from any domain-specific timeout protocols enforced by any of the plurality of application domains; and
   granting access to the first resource according to the timeout protocol.

2. The method of claim 1, wherein the timeout protocol comprises:
   a session length;
   an idle timeout; and
   a number of sessions per user.

3. The method of claim 1, wherein the first attribute comprises a security attribute that is used only with timeout protocols.

4. The method of claim 3, wherein the security attribute can be assigned values comprising: high, medium, and low.

5. The method of claim 1, further comprising:
   storing a global timeout protocol;
   receiving a second request for a second resource in the plurality of resources that is associated with the first attribute, wherein the first attribute is assigned a second value;
   determining that the second value does not satisfy the at least one criterion; and
   granting access to the second resource according to the global timeout protocol.

6. The method of claim 1, further comprising:
   storing an authentication policy, wherein the authentication policy comprises a policy timeout protocol;
   receiving a second request for a second resource in the plurality of resources that is associated with the first attribute, wherein the first attribute is assigned a second value;
   determining that the second value does not satisfy the at least one criterion;
   determining that the second resource is associated with the authentication policy; and
   granting access to the second resource according to the policy timeout protocol.

7. The method of claim 6, wherein the authentication policy is applied to an entire application domain that comprises the first resource.

8. The method of claim 1, wherein the first attribute is:
   user-defined, and
   not associated with all of the plurality of resources.

9. A non-transitory computer-readable memory having stored thereon a sequence of instructions which, when executed by one or more processors, causes the one or more processors to apply timeout protocols by an access manager to a plurality of resources that are spread across a plurality of separate application domains by:
   storing a plurality of timeout protocols, wherein each of the plurality of timeout protocols:
   comprises at least one criterion specifying when the corresponding timeout protocol is to be applied to resources in the plurality of resources instead of domain-specific timeout protocols; and
   determines when an authenticated session between a user and a resource should be terminated;
   receiving a request for a first resource in the plurality of resources, wherein:
   each of the plurality of separate application domains enforces at least one domain-specific timeout protocol;
   the first resource has a first attribute; and
   the first attribute is assigned a first value;
   responsive to the request, determining that the first value satisfies the at least one criterion of a timeout protocol in the plurality of timeout protocols;
   based on determining that the first value satisfies the at least one criterion, applying the timeout protocol to the first resource;
   responsive to determining that the first value satisfies the at least one criterion of the timeout protocol, determining each resource in the plurality of resources that is associated with the first attribute and that has the first attribute assigned a value that satisfies the at least one criterion;

applying the timeout protocol to each determined resource;
enforcing the timeout protocol, by the access manager, on each determined resource in the plurality of the separate application domains, wherein the timeout protocol enforced by the access manager is distinct from any domain-specific timeout protocols enforced by any of the plurality of application domains; and
granting access to the first resource according to the timeout protocol.

10. The non-transitory computer-readable memory according to claim 9, wherein the timeout protocol comprises:
a session length;
an idle timeout; and
a number of sessions per user.

11. The non-transitory computer-readable memory according to claim 9, wherein the first attribute comprises a security attribute that is used only with timeout protocols.

12. The non-transitory computer-readable memory according to claim 9, wherein the security attribute can be assigned values comprising: high, medium, and low.

13. The non-transitory computer-readable memory according to claim 9, wherein the instructions further cause the one or more processors to apply a timeout protocol by an access manager to a plurality of resources that are spread across a plurality of separate application domains by:
storing a global timeout protocol;
receiving a second request for a second resource in the plurality of resources that is associated with the first attribute, wherein the first attribute is assigned a second value;
determining that the second value does not satisfy the at least one criterion; and
granting access to the second resource according to the global timeout protocol.

14. The non-transitory computer-readable memory according to claim 9, wherein the instructions further cause the one or more processors to apply a timeout protocol by an access manager to a plurality of resources that are spread across a plurality of separate application domains by:
storing an authentication policy, wherein the authentication policy comprises a policy timeout protocol;
receiving a second request for a second resource in the plurality of resources that is associated with the first attribute, wherein the first attribute is assigned a second value;
determining that the second value does not satisfy the at least one criterion;
determining that the second resource is associated with the authentication policy; and
granting access to the second resource according to the policy timeout protocol.

15. The non-transitory computer-readable memory according to claim 9, wherein the authentication policy is applied to an entire application domain that comprises the first resource.

16. The non-transitory computer-readable memory according to claim 9, wherein the first attribute is:
user-defined, and
not associated with all of the plurality of resources.

17. A system comprising:
one or more processors; and
a memory communicatively coupled with and readable by the one or more processors and having stored therein a sequence of instructions which, when executed by the one or more processors, cause the one or more processors to apply timeout protocols by an access manager to a plurality of resources that are spread across a plurality of separate application domains by:
storing a plurality of timeout protocols, wherein each of the plurality of timeout protocols:
comprises at least one criterion specifying when the corresponding timeout protocol is to be applied to resources in the plurality of resources instead of domain-specific timeout protocols; and
determines when an authenticated session between a user and a resource should be terminated;
receiving a request for a first resource in the plurality of resources, wherein:
each of the plurality of separate application domains enforces at least one domain-specific timeout protocol;
the first resource has a first attribute; and
the first attribute is assigned a first value;
responsive to the request, determining that the first value satisfies the at least one criterion of a timeout protocol in the plurality of timeout protocols;
based on determining that the first value satisfies the at least one criterion, applying the timeout protocol to the first resource;
responsive to determining that the first value satisfies the at least one criterion of the timeout protocol, determining each resource in the plurality of resources that is associated with the first attribute and that has the first attribute assigned a value that satisfies the at least one criterion;
applying the timeout protocol to each determined resource;
enforcing the timeout protocol, by the access manager, on each determined resource in the plurality of the separate application domains, wherein the timeout protocol enforced by the access manager is distinct from any domain-specific timeout protocols enforced by any of the plurality of application domains; and
granting access to the first resource according to the timeout protocol.

18. The system of claim 17 wherein the instructions further cause the one or more processors to apply a timeout protocol by an access manager to a plurality of resources that are spread across a plurality of separate application domains by:
storing an authentication policy, wherein the authentication policy comprises a policy timeout protocol;
receiving a second request for a second resource in the plurality of resources that is associated with the first attribute, wherein the first attribute is assigned a second value;
determining that the second value does not satisfy the at least one criterion;
determining that the second resource is associated with the authentication policy; and
granting access to the second resource according to the policy timeout protocol.

19. The system of claim 17 wherein the timeout protocol comprises:
a session length;
an idle timeout; and
a number of sessions per user.

20. The system of claim 17 wherein the first attribute comprises a security attribute that is used only with timeout protocols.

* * * * *

UNITED STATES PATENT AND TRADEMARK OFFICE
CERTIFICATE OF CORRECTION

| | |
|---|---|
| PATENT NO. | : 9,596,328 B2 |
| APPLICATION NO. | : 13/571045 |
| DATED | : March 14, 2017 |
| INVENTOR(S) | : Subramanya et al. |

It is certified that error appears in the above-identified patent and that said Letters Patent is hereby corrected as shown below:

In the Drawings

On sheet 7 of 10, in FIG. 7, under Reference Numeral 710, Line 2, delete "remaning" and insert -- remaining --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*